US012722324B2

(12) United States Patent
Wang et al.

(10) Patent No.: US 12,722,324 B2
(45) Date of Patent: Sep. 1, 2026

(54) REBAR, DEVICE AND CONSTRUCTION METHOD FOR 3D-PRINTING A CONCRETE INTERLAYER STRUCTURE

(71) Applicant: CHINA BUILDING MATERIALS ACADEMY, Beijing (CN)

(72) Inventors: Zhendi Wang, Beijing (CN); Ling Wang, Beijing (CN)

( * ) Notice: Subject to any disclaimer, the term of this patent is extended or adjusted under 35 U.S.C. 154(b) by 421 days.

(21) Appl. No.: 18/273,112

(22) PCT Filed: Nov. 25, 2022

(86) PCT No.: PCT/CN2022/134299
§ 371 (c)(1),
(2) Date: Feb. 12, 2024

(87) PCT Pub. No.: WO2023/231326
PCT Pub. Date: Dec. 7, 2023

(65) Prior Publication Data

US 2024/0093518 A1 Mar. 21, 2024

(30) Foreign Application Priority Data

May 31, 2022 (CN) ......................... 202210610642.8

(51) Int. Cl.
*B28B 1/00* (2006.01)
*B33Y 10/00* (2015.01)
(Continued)

(52) U.S. Cl.
CPC ................ *B28B 1/001* (2013.01); *E04C 5/00* (2013.01); *E04C 5/16* (2013.01); *E04C 5/162* (2013.01);
(Continued)

(58) Field of Classification Search
CPC . B28B 1/001; B28B 23/005; B28B 23/02–22; E04C 5/12–127; E04C 5/16–208
See application file for complete search history.

(56) References Cited

U.S. PATENT DOCUMENTS 10,041,252 B1 * 8/2018 Bongiorno ............ E04C 5/0622
10,982,443 B1 * 4/2021 Abbas ..................... E04C 5/122
(Continued)

FOREIGN PATENT DOCUMENTS

CN 103154402 A 6/2013
CN 105599104 * 5/2016
(Continued)

OTHER PUBLICATIONS

Extended European Search Report for International Patent Application PCT/CN2022/13429, mailed on Jun. 13, 2024, 9 pages.
(Continued)

*Primary Examiner* — Jeffrey M Wollschlager
(74) *Attorney, Agent, or Firm* — Rivkin Radler LLP

(57) ABSTRACT

The present application relates to the technical field of engineering construction and provides a rebar, a device and a construction method for 3D-printing a concrete interlayer structure. The rebar at least comprises: a body in the form of a chain structure, comprising a plurality of sub-parts mutually spliced, wherein the body is adapted for being sandwiched between two adjacent upper and lower cement-based slurry layers; a rotatable joint arranged between two adjacent sub-parts in such a way that the two adjacent sub-parts are rotatably connected to each other; insertion members, wherein both sides of each of the sub-parts are provided with the insertion members extending away from the center of each of the sub-parts, wherein the insertion member on one side of each of the sub-parts is adapted for being inserted in an upper cement-based slurry layer, and the insertion member on an opposite side of each of the sub-parts is adapted
(Continued)

for being inserted in a lower cement-based slurry layer. In summary, the rebar can simultaneously enhance the bearing capacity of the printed structure both in the horizontal direction and in the vertical direction, improve the overall connection strength of the printed structure, so that the building structure is not prone to damage or collapse, which is conducive to reducing any potential safety hazard.

12 Claims, 8 Drawing Sheets

(51) Int. Cl.

| | |
|---|---|
| ***B33Y 30/00*** | (2015.01) |
| ***B33Y 80/00*** | (2015.01) |
| ***E04C 5/00*** | (2006.01) |
| ***E04C 5/16*** | (2006.01) |
| ***E04G 21/04*** | (2006.01) |
| ***E04G 21/12*** | (2006.01) |
| ***F16G 13/18*** | (2006.01) |

(52) U.S. Cl.
CPC .............. *E04C 5/163* (2013.01); *E04G 21/04* (2013.01); *E04G 21/12* (2013.01); *F16G 13/18* (2013.01); *B33Y 10/00* (2014.12); *B33Y 30/00* (2014.12); *B33Y 80/00* (2014.12)

(56) References Cited

U.S. PATENT DOCUMENTS

| | | | | |
|---|---|---|---|---|
| 2013/0196107 | A1 | 8/2013 | Persson | |
| 2015/0040496 | A1* | 2/2015 | Holzberger | E04B 1/415<br>52/223.13 |
| 2017/0016244 | A1* | 1/2017 | Keller | E04G 21/0463 |
| 2019/0177976 | A1 | 6/2019 | Fukuda et al. | |
| 2020/0391409 | A1* | 12/2020 | Wang | B28B 1/001 |
| 2021/0370546 | A1* | 12/2021 | Mayer | E04G 21/0463 |
| 2022/0034108 | A1* | 2/2022 | Cooper | F03D 13/20 |
| 2022/0055249 | A1* | 2/2022 | Rzadkowski | B33Y 30/00 |
| 2023/0150168 | A1* | 5/2023 | Gouwy | B28B 23/02<br>428/457 |
| 2023/0339140 | A1* | 10/2023 | Na | B29C 64/241 |
| 2024/0262005 | A1* | 8/2024 | Jacquet | B29C 64/209 |

FOREIGN PATENT DOCUMENTS

| | | | |
|---|---|---|---|
| CN | 109531771 | A | 3/2019 |
| CN | 109531772 | A | 3/2019 |
| CN | 210177810 | U | 3/2020 |
| CN | 111015891 | A | 4/2020 |
| CN | 111335550 | A | 6/2020 |
| CN | 211164453 | A | 8/2020 |
| CN | 112412043 | A | 2/2021 |
| CN | 113400435 | A | 9/2021 |
| DE | 102020120895 | A | 2/2022 |
| KR | 109531771 | A | 7/2010 |
| WO | 2018/070429 | A | 4/2018 |

OTHER PUBLICATIONS

Roller Chains With Extended and Hollow Pins, Feb. 5, 2016 (Feb. 5, 2016), pp. 1-20, XP093170745, https://www.tyma.eu/files/retezy/cz-chains-ext-pins.pdf?srsltid=AfmBOopzHhHLPX7bFq3d0jraYEAvC7dFIxhsizMKWjT5ZvKOdbpnAmuH.
Search Report for International Patent Application PCT/CN2022/134299, mailed on Feb. 22, 2023, 4 pages.
Written Opinion of International Searching Authority for PCT/CN2022/134299, mailed on Feb. 22, 2023, 4 pages.

* cited by examiner

REBAR, DEVICE AND CONSTRUCTION METHOD FOR 3D-PRINTING A CONCRETE INTERLAYER STRUCTURE

TECHNICAL FIELD

The present application relates to the technical field of engineering construction, and in particular relates to a rebar, a device and a construction method for 3D-printing a concrete interlayer structure.

BACKGROUND 3D-printed concrete (3DPC) technology is a novel digital method. At present, 3DPC technology has been successfully applied in fields such as construction of houses and bridges, and will have broad prospects in the future in fields of extreme conditions or unmanned construction, etc. 3DPC technology can produce geometrically complex structures without using expensive templates, meanwhile reduce labor intensity, construction time and economic costs, and greatly reduce construction waste and $CO_2$ emission. It is a new kind of green sustainable construction technology.

In a process of building structure preparation, cement-based slurry loaded into a liquid storage chamber in the 3D printer is printed on a building base layer by layer through the nozzle, and the building structure is formed after the cement-based slurry layers are solidified. However, there is an interface between adjacent layers of cement-based slurry, and the bonding strength and toughness at the interlayer interface are poor due to the water content on the surface of the printed slurry and the existence of printing time interval. When subjected to external driving force, phenomena of delamination and debonding are prone to occur at the interlayer interface of adjacent cement-based slurry layers, resulting in that phenomena of damage or collapse are prone to occur in building structures prepared by printing cement-based slurry and potential safety hazards exist.

SUMMARY

Therefore, the technical problem to be solved by the present application is that phenomena of damage or collapse are prone to occur in building structures prepared by printing cement-based slurry and potential safety hazards exist in the prior art, so as to provide a rebar, a device and a construction method for 3D-printing a concrete interlayer structure.

In order to solve the above-mentioned technical problem, the technical solution of the present application is as follows:

An rebar for 3D-printing a concrete interlayer structure, at least comprising: a body in the form of a chain structure, comprising a plurality of sub-parts mutually spliced, the body being adapted for being sandwiched between two adjacent upper and lower cement-based slurry layers; a rotatable joint arranged between two adjacent sub-parts in such a way that the two adjacent sub-parts are rotatably connected to each other; insertion members, wherein both sides of each of the sub-parts are provided with the insertion members extending away from the center of each of the sub-parts, the insertion member on one side of each of the sub-parts is adapted for being inserted in an upper cement-based slurry layer, and the insertion member on an opposite side of each of the sub-parts is adapted for being inserted in a lower cement-based slurry layer.

Optionally, the rotatable joint comprises a connection block, a first rotatable shaft and a second rotatable shaft; the first rotatable shaft and the second rotatable shaft are both arranged on the connection block, and the first rotatable shaft and the second rotatable shaft are perpendicular to each other; one of the two adjacent sub-parts is rotatably connected to the first rotatable shaft, and the other one of the two adjacent sub-parts is rotatably connected to the second rotatable shaft.

Optionally, the rotatable joint comprises a first convex part and a first groove; the first convex part is located on one end of each sub-part, the first groove is located on an opposite end of each sub-part, and the two adjacent sub-parts are connected to each other through the first groove and the first convex part.

Optionally, the rebar further comprises an elastic element arranged between each sub-part and the insertion members, so that the insertion members are telescopically arranged on both sides of each sub-part.

A device for 3D-printing a concrete interlayer structure, comprising the above-mentioned rebar, and further comprising: a concrete printing system configured to print cement-based slurry layers stacked from bottom to top on a building base; a rebar distributing system configured to lay the rebar on the printed cement-based slurry layers; wherein, the sub-parts are sandwiched between two upper and lower adjacent cement-based slurry layers, the insertion member on one side of each of the sub-parts is configured to be inserted in an upper cement-based slurry layer, and the insertion member on an opposite end of each of the sub-parts is configured to be inserted in a lower cement-based slurry layer.

Optionally, the rebar distributing system comprises a storage box and a conveying structure; the storage box is provided with a rebar outlet, and the rebar is coiled in the storage box; the conveying structure is located outside the storage box and is arranged to directly face the rebar outlet, one end of the rebar extends out of the rebar outlet and is driven by the conveying structure to be transported to a target position.

Optionally, the rebar distributing system further comprises a guide tube; one end of the guide tube is communicated with the rebar outlet of the storage box, and an opposite end of the guide tube extends toward the direction of the cement-based slurry layer; when the rebar is located in the guide tube, the elastic element between the insertion members and each sub-part is in a compression state; a tube wall of the guide tube is provided with an opening, and a working part of the conveying structure is at least partially located in the guide tube through the opening to be in contact with the rebar, and the working part is configured to drive the rebar forward along a conveying direction in the guide tube.

Optionally, the conveying structure comprises a first conveying wheel, a second conveying wheel and a power part; the first conveying wheel and the second conveying wheel are symmetrically arranged on both sides of the guide tube, the first conveying wheel and the second conveying wheel both at least partially extend into the guide tube, the rebar is sandwiched between the first conveying wheel and the second conveying wheel, and the length direction of the insertion members is parallel to the axis of the first conveying wheel; an output end of the power part is connected to the first conveying wheel and is configured to drive the first conveying wheel to rotate.

Optionally, the rebar distributing system further comprises a separation posture-adjustment box which comprises a separation part, a control valve and a stopper; the separation posture-adjustment box is located on one side of the conveying structure away from the storage box, and the guide tube passes through the separation posture-adjustment box; the separation part and the stopper are both arranged in the separation posture-adjustment box, and the rebar in the guide tube is located between the separation part and the stopper; the control valve is connected to the separation part and is configured to drive the separation part to move towards the stopper to separate the rebar.

Optionally, the concrete printing system comprises a mixer, a hopper, a screw extruder and a print head; an outlet of the mixer is connected to an inlet of the hopper and is configured to provide concrete to the hopper; the screw extruder is arranged in the hopper and is configured to extrude the concrete out of the hopper; the print head is arranged at an outlet of the hopper so that the concrete extruded from the hopper has a preset 3D structure.

Optionally, the device further comprises a lifting base frame; wherein the concrete printing system and the rebar distributing system are both arranged on the lifting base frame to be movable along the length direction of the lifting base frame; the lifting base frame is able to move vertically to drive the concrete printing system and the rebar distributing system to move synchronously with each other.

Optionally, the device further comprises a control system; wherein the control system is signal-connected to both the concrete printing system and the rebar distributing system, and is configured to control synchronous movement of the concrete printing system and the rebar distributing system along the lifting base frame.

A construction method of a 3D-printed concrete interlayer structure, which uses the above-mentioned rebar and the above-mentioned device, and the method comprises the following steps: using the concrete printing system to print a cement-based slurry layer on a building base; using the rebar distributing system to lay the rebar on the surface of the printed cement-based slurry layer; printing the respective cement-based slurry layers and distributing the rebar thereon layer by layer to sandwich the sub-parts between two adjacent upper and lower cement-based slurry layers, wherein the insertion member on one side of each of the sub-parts is inserted in an upper cement-based slurry layer, and the insertion member on an opposite side of each of the sub-parts is inserted in a lower cement-based slurry layer, until the printing of building structure is completed.

Optionally, the construction method further comprises the following steps before using the concrete printing system to print the cement-based slurry layer on the building base: digitally modeling the print structure to generate G code; loading the rebar distributing system with the rebar and setting operation parameters thereof; stirring cement-based materials sufficiently and delivering the stirred cement-based materials to the concrete printing system; starting up a control system, importing the G code and debugging the print parameters; moving the concrete printing system and the rebar distributing system synchronously with a lifting base frame.

Optionally, when printing the respective cement-based slurry layers and distributing the rebar thereon layer by layer: after one layer is printed, lifting a print head of the concrete printing system and the rebar distributing system by the height of one layer, and then printing the next cement-based slurry layer and distributing the rebar thereon; wherein the rebar distributing system distributes the rebar continuously during the lifting process, so that the rebar is continuous between two adjacent cement-based slurry layers.

The technical solution of the present application has the following advantages:

In the rebar for 3D-printing a concrete interlayer structure provided in the present application, the sub-parts can be stably arranged on the surface of a cement-based slurry layer, and has certain rigidity, which can play the role of a hoop rebar, and is conducive to increasing the interlayer bonding strength and bearing capacity of the printed structure in the horizontal direction. Moreover, the entire rebar is bendable due to the existence of the rotatable joint, so that the rebar can be continuous between two adjacent cement-based slurry layers, which is conducive to improving the overall connection strength of the printed structure. Besides, the insertion members are inserted into the slurry of the cement-based slurry layers to ensure the connection tightness between the cement-based slurry layers and the distributed rebar, so as to enhance the tensile strength of the printed structure in the vertical direction. In summary, the rebar can simultaneously enhance the bearing capacity of the printed structure both in the horizontal direction and in the vertical direction, improve the overall connection strength of the printed structure, so that the building structure is not prone to damage or collapse, which is conducive to reducing any potential safety hazard.

BRIEF DESCRIPTION OF THE DRAWINGS

In order to more clearly describe the technical solution in the specific implementation of the present application or in the prior art, hereinafter, the drawings that need to be used in describing the specific implementation or the prior art will be briefly introduced. Apparently, the drawings in the following description are just some implementations of the present application. For a person with ordinary skill in the art, other drawings can also be obtained from these drawings without expenditure of creative labor.

LIST OF REFERENCE SIGNS

Figure 1:
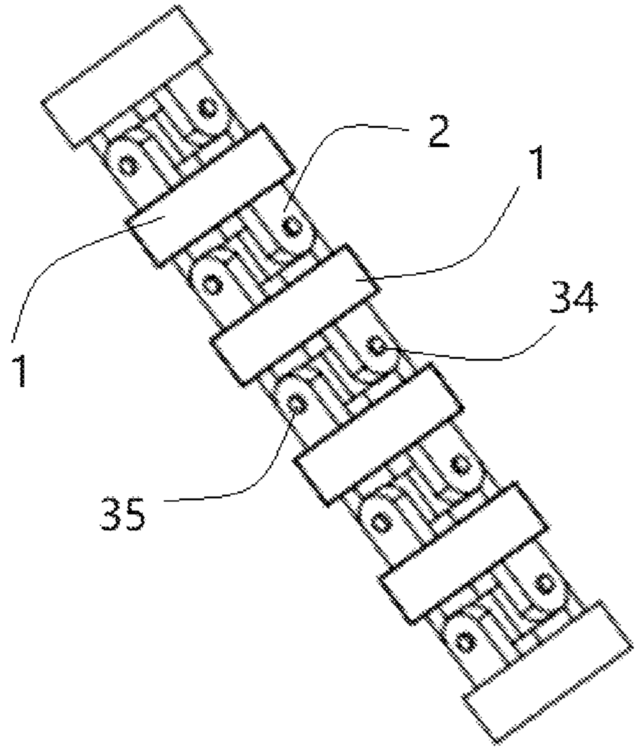
FIG. 1 is a schematic diagram of a rebar for 3D-printing a concrete interlayer structure in one embodiment of the present application.

1. sub-part;
2. ear plate;
3. insertion member;
4. body;
5. cement-based slurry layer;
6. short bar;
7. thin steel bar;
8. first convex part;
9. first groove;
10. first substrate;
11. second substrate;
12. second convex part;
13. second groove;
14. control system;
15. lifting base frame;
16. storage box;
17. controller;
18. hopper;
19. mixer;
20. screw extruder;
21. conveying structure;
22. guide tube;
23. guide nozzle;
24. first conveying wheel;
25. second conveying wheel;
26. separation posture-adjustment box;
27. stopper;
28. separation part;
29. control valve;
30. elastic element;
31. feed pipe;
32. rotation control part;
33. long steel bar;
34. first rotatable shaft;
35. second rotatable shaft.

DETAILED DESCRIPTION OF SPECIFIC EMBODIMENTS

The technical solution of the present application will be described clearly and completely hereinafter in combination with the drawings. Apparently, the described embodiments are part of embodiments of the present application, not all of them. Based on the embodiments described in the present application, all other embodiments obtainable by a person with ordinary skill in the art without expenditure of creative labor should belong to the protection scope of the present application.

In the description of the present application, it should be noted that the orientations or position relationships indicated by the terms "center", "top", "bottom", "left", "right", "vertical", "horizontal", "inside", "outside", etc. are based on the orientation or position relationship shown in the drawings, and are only used for the convenience of describing the present application and simplifying the description, rather than indicating or implying that the device or element referred to must have a specific orientation, be constructed and operated in a specific orientation, and therefore cannot be understood as a limitation to the present application. In addition, the terms "first", "second" and "third" are only used for descriptive purposes and cannot be understood as indicating or implying relative importance.

In the description of the present application, it should be noted that, unless otherwise clearly specified and defined, the terms "installed", "connected" and "coupled" should be understood in a broad sense, for example, they can be fixed connection, detachable connection or integral connection; they can be mechanical connection or electrical connection; they can be direct connection, or indirect connection through an intermediate medium, they can be internal communication between two elements. For a person with ordinary skill in the art, the specific meaning of the above-mentioned terms in the present application can be understood according to specific circumstances.

In addition, the technical features involved in different embodiments of the present application described below can be combined with one another as long as they do not conflict with one another.

FIG. 1 is a schematic diagram of a rebar for 3D-printing a concrete interlayer structure in one embodiment of the present application; as shown in FIG. 1, the present embodiment provides a rebar for 3D-printing a concrete interlayer structure, at least comprising: a body 4 in the form of a chain structure, comprising a plurality of sub-parts 1 mutually spliced, the body 4 is adapted for being sandwiched between two adjacent upper and lower cement-based slurry layers 5, wherein, the sub-parts 1 may have a plate-shaped structure or a column-shaped structure; a rotatable joint arranged between two adjacent sub-parts 1 in such a way that the two adjacent sub-parts 1 are rotatably connected to each other; insertion members 3, wherein both sides of each of the sub-parts 1 are provided with the insertion members 3 extending away from the center of each of the sub-parts 1, the insertion member 3 on one side of each of the sub-parts 1 is adapted for being inserted in an upper cement-based slurry layer 5, and the insertion members 3 on an opposite side of each of the sub-parts 1 are adapted for being inserted in a lower cement-based slurry layer 5. For example, the insertion members 3 can have a rod-shaped structure such as a round rod, a square rod, etc. Optionally, the insertion members 3 are arranged perpendicular to an outer wall of the corresponding sub-part 1.

In the rebar for 3D-printing a concrete interlayer structure provided in the present embodiment, the sub-parts 1 can be stably arranged on the surface of a cement-based slurry layer 5, and has certain rigidity, which can play the role of a hoop rebar and is conducive to increasing the interlayer bonding strength and bearing capacity of the printed structure in the horizontal direction. Moreover, the entire rebar is bendable due to the existence of the rotatable joint, so that the rebar can be continuous between two adjacent cement-based slurry layers 5, which is conducive to improving the overall connection strength of the printed structure. Besides, the insertion members 3 are inserted into the slurry of the cement-based slurry layers 5 to ensure the connection tightness between the cement-based slurry layers 5 and the distributed rebar, so as to enhance the tensile strength of the printed structure in the vertical direction. In summary, the rebar can simultaneously enhance the bearing capacity of the printed structure both in the horizontal direction and in the vertical direction, improve the overall connection strength of the printed structure, so that the building structure is not prone to damage or collapse, which is conducive to reducing any potential safety hazard.

As shown in FIG. 1, for example, the rotatable joint comprises a connection block, a first rotatable shaft 34 and a second rotatable shaft 35; the connection block can have a cube structure, and the connection block is provided with through holes, which can be used to insert the first rotatable shaft 34 and the second rotatable shaft 35 therethrough, and the first rotatable shaft 34 and the second rotatable shaft 35 are perpendicular to each other; for example, an end of each of sub-parts 1 are provided with two ear plates 2 in parallel and spaced apart. An upper sub-part 1 is rotatably connected to both ends of the first rotatable shaft 34 by the ear plates 2 thereon, and another sub-part 1 is rotatably connected to the second rotatable shaft 35 by the ear plates 2 thereon. With this arrangement, it is not necessary to separate the rebar at a turning corner of a cement-based slurry layer 5 of the same layer or at the transition between cement-based slurry layers 5 of different layers, and therefore the continuity of the rebar is maintained, which is conducive to improving the integrity and connection strength of the printed structure.

Wherein, the first rotatable shaft 34 or the second rotatable shaft 35 can extend out of the ear plate 1. At this time, the extension part of the first rotatable shaft 34 or the second rotatable shaft 35 can be used as the insertion member 3.

Wherein, the rebar further comprises an elastic element arranged between each sub-part 1 and the insertion members 3, so that the insertion members 3 are telescopically arranged on both sides of each sub-part 1. For example, the elastic element can be a coil spring. For example, one end of the elastic element can be fixedly connected to an outer wall of the each of the sub-parts 1, and an opposite end of the elastic element is fixedly connected to the insertion member 3. For example, an accommodation space can be provided inside each sub-part 1, the elastic element is located in the accommodation space, and a side wall of the sub-part 1 is provided with a through hole. Both ends of the elastic element are each fixedly connected to a flat plate, the size of which is larger than the size of the through hole, so that the elastic element does not protrude out of the through hole. The insertion member 3 can be fixedly connected to the flat plate, and the insertion member 3 can retract into the accommodation space when the insertion member 3 is pressed, whereas the insertion member 3 extends out of the side wall of the sub-part 1 when it is not pressed. With this arrangement, when the sub-part 1 is in contact with the cement-based slurry layer 5, the insertion member 3 pops out to increase its insertion depth in the cement-based slurry layer 5.

Figure 2:
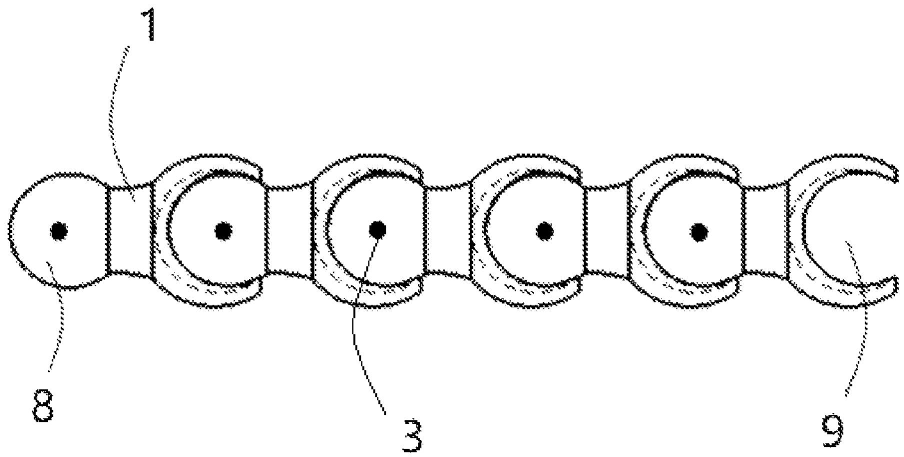
FIG. 2 is a schematic diagram of a rebar for 3D-printing a concrete interlayer structure in another embodiment of the present application.
Figure 3:
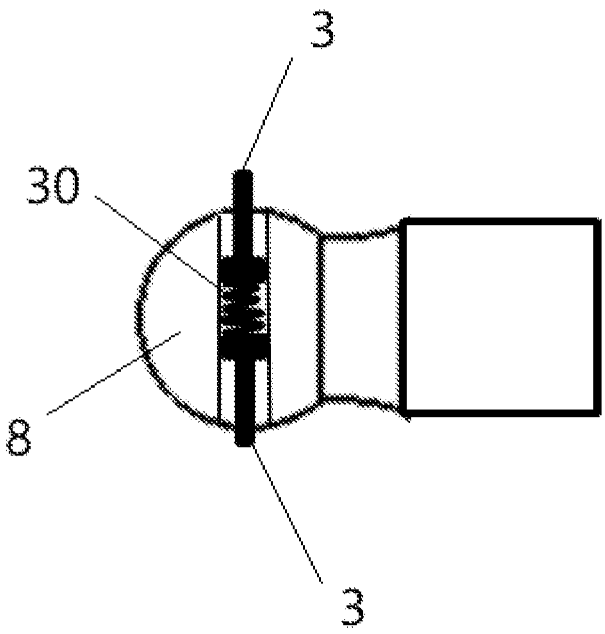
FIG. 3 is a schematic diagram of the elastic element in the rebar in FIG. 2 in a compression state.
Figure 4:
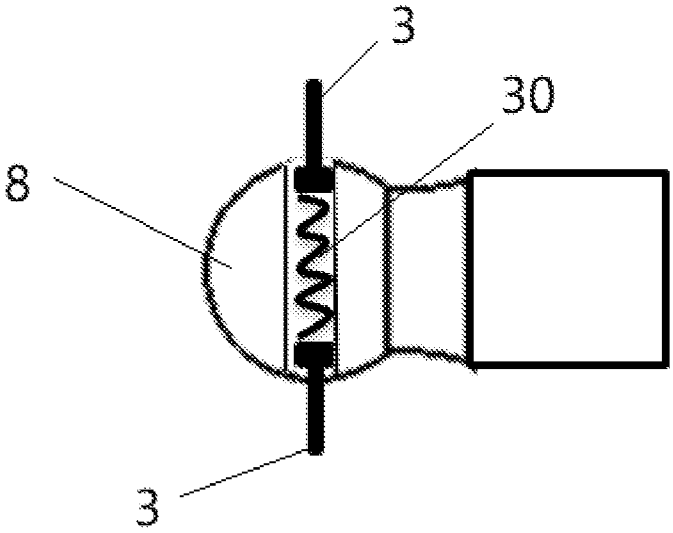
FIG. 4 is a schematic diagram of the elastic element in the rebar in FIG. 2 in an extension state.

FIG. 2 is a schematic diagram of a rebar for 3D-printing a concrete interlayer structure in another embodiment of the present application; as shown in FIG. 2, in another embodiment, the rotatable joint may also comprise a first convex part 8 and a first groove 9; the first convex part 8 is located on one end of each sub-part 1, the first groove 9 is located on an opposite end of each sub-part 1, and the two adjacent sub-parts 1 are connected to each other through the first groove 8 and the first convex part 9. For example, the first convex part 8 can have a spherical structure, the first groove 9 have a pit structure matched with the first convex part 8, and the first convex part 8 can rotate freely after being clamped in the first groove 9, so that the whole body 4 can bend in any direction. With this arrangement, the rebar formed by connecting the plurality of sub-parts 1 has three-dimensional degrees of freedom. During the subsequent construction, different rebar distributing forms can be selected according to situations thereof. For example, the rebar can be continuous between two adjacent cement-based slurry layers 5. At this time, a rebar distributing system can distribute the rebar continuously during a lifting process, and the rebar can be bent at the transition between two adjacent cement-based slurry layers 5 without separation, which is beneficial for realizing the continuity of construction and improving the degree of automation. For example, the rebar can also be separated at the transition between two adjacent cement-based slurry layers 5, which makes the overall rebar distributing form more flexible and more applicable. Wherein, the two sides of each of the sub-parts 1 may not be provided with the insertion members 3. Optionally, the two sides of each of the sub-parts 1 are provided with the insertion members 3. FIG. 3 is a schematic diagram of the elastic element in the rebar in FIG. 2 in a compression state; FIG. 4 is a schematic diagram of the elastic element in the rebar in FIG. 2 in an extension state; as shown in FIGS. 2, 3 and 4, the elastic element may also be arranged in the first convex part, and the two ends of the elastic element are respectively connected to an insertion member 3. The whole rebar has a chain structure. The arrangement of the rotatable joint makes the sub-parts 1 flexible to rotate. The sub-parts 1 are stably arranged on the surface of the cement-based slurry layer 5, and has certain rigidity, which is conducive to increasing the interlayer bonding strength and bearing capacity of the printed structure in the horizontal direction, so that the building structure is not prone to damage or collapse, which is conducive to reducing any potential safety hazard.

The rebar in another embodiment at least comprises: a body 4 in the form of a chain structure, comprising a plurality of sub-parts 1 mutually spliced, wherein the body 4 is adapted for being sandwiched between two adjacent upper and lower cement-based slurry layers 5; for example, the sub-parts 1 may have a plate-shaped structure or a column-shaped structure. Both sides of each of the sub-parts 1 are provided with insertion members 3 extending away from the center of each of the sub-parts 1, the insertion member 3 on one side of each of the sub-parts 1 are adapted for being inserted in an upper cement-based slurry layer 5, and the insertion member 3 on an opposite side of each of the sub-parts 1 are adapted for being inserted in a lower cement-based slurry layer 5. For example, the insertion members 3 on both sides of each of the sub-parts 1 can be an integral structure. At this time, the side walls of each of the sub-parts 1 are each provided with a through hole, wherein the integral insertion member 3 is inserted in the respective through holes and penetrate the sub-part 1. For example, the insertion members 3 on both sides of each of the sub-parts 1 may also be independent from each other, and the insertion members 3 may be welded on the side walls of each of the sub-parts 1. Wherein, the insertion members 3 may also be integrally formed with the sub-part 1. There is an included angle between each of the insertion members 3 and the side wall of each of the sub-parts 1. Optionally, the insertion members 3 are arranged perpendicular to the side walls of each of the sub-parts 1.

Figure 5:
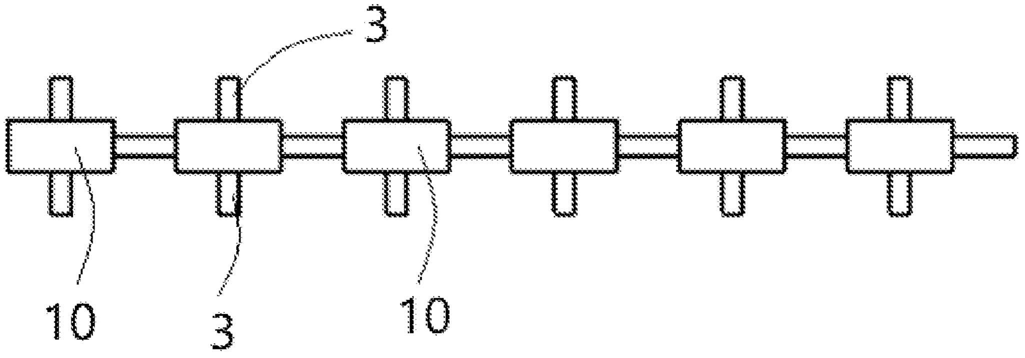
FIG. 5 is a schematic diagram of a rebar for 3D-printing a concrete interlayer structure in another embodiment of the present application.

FIG. 5 is a schematic diagram of a rebar for 3D-printing a concrete interlayer structure in another embodiment of the present application; as shown in FIG. 5, for example, each sub-part 1 has a first base body 10 having a rectangular structure, and two adjacent first base bodies 10 are connected to each other by welding to a connection rod. For example, the connection rod may be a circular rod. For example, the insertion member 3 may be a round rod. The side walls of the first base body 10 are provided with through holes, the insertion member 3 is inserted in the through holes, with both ends extending out of the side walls of the first base body 10.

Figure 6:
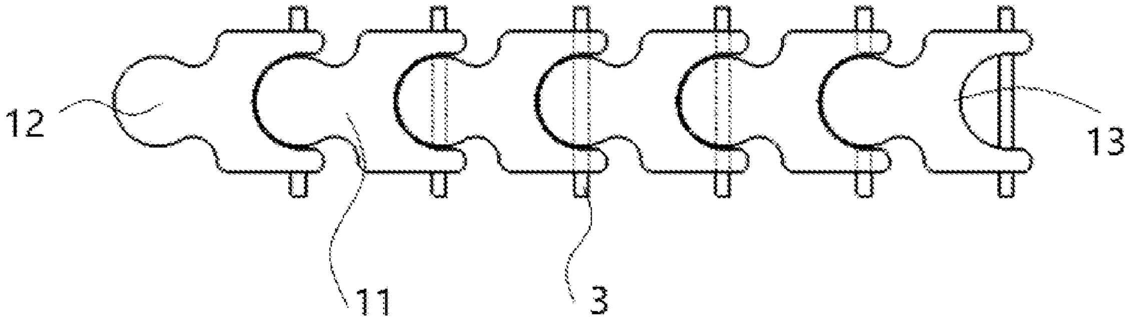
FIG. 6 is a schematic diagram of a rebar for 3D-printing a concrete interlayer structure in another embodiment of the present application.

FIG. 6 is a schematic diagram of a rebar for 3D-printing a concrete interlayer structure in another embodiment of the present application; as shown in FIG. 6, for example, each sub-part 1 has a second base body 11 having a plate-shaped structure, and one end of the second base body 11 has a second convex part 12, for example, the second convex part 12 can have a spherical structure, and the other end of the second substrate 11 has a second groove 13. Two adjacent second base bodies 11 are connected to each other through the second convex part 12 and the second groove 13; the insertion members 3 are arranged on the second base body 11. Optionally, the insertion members 3 each have a shaft structure, and both the second substrate 11 and the second convex part 12 are provided with through holes. Each of the insertion members 3 are inserted in the through holes, with both ends thereof extending out of the side walls of the second base body 11. The second convex part 12 is arranged in the second groove 13 to be rotatable around the insertion member 3.

Figure 11:
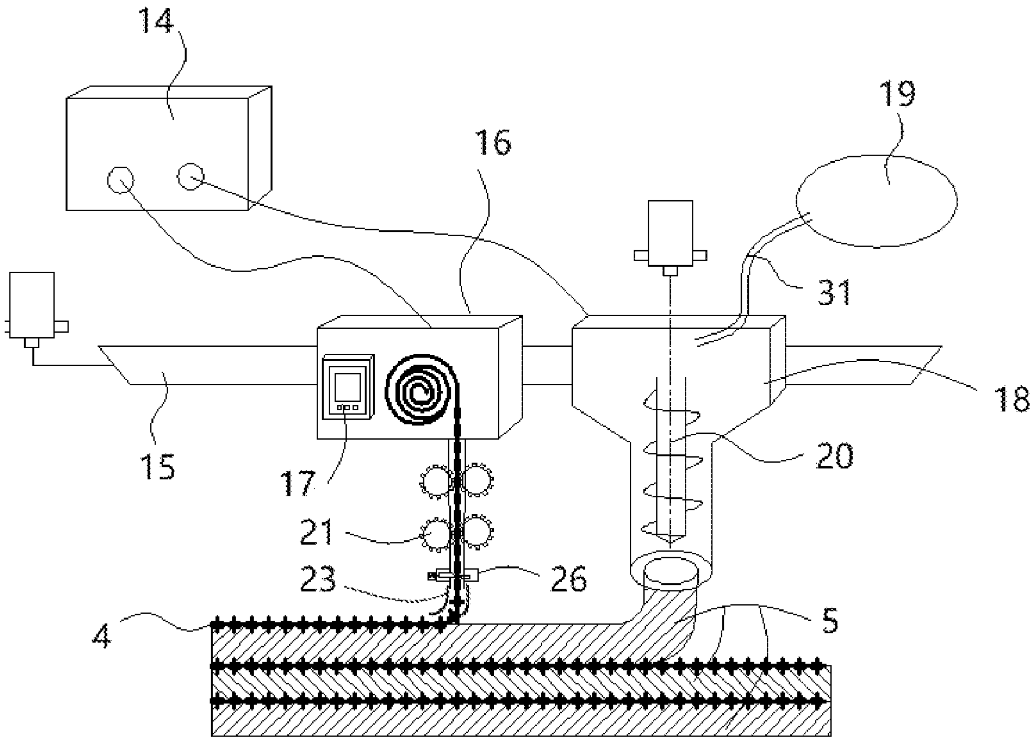
FIG. 11 is a schematic diagram of a device for 3D-printing a concrete interlayer structure in an embodiment of the present application.

FIG. 11 is a schematic diagram of a device for 3D-printing a concrete interlayer structure in an embodiment of the present application; as shown in FIG. 11, another embodiment provides a device for 3D-printing a concrete interlayer structure, comprising a rebar distributing system, a concrete printing system, a control system 14, and a lifting base frame 15.

As for the concrete printing system, it is configured to print cement-based slurry layers 5 stacked from bottom to top on a building base; and as for the rebar distributing system, it is configured to lay the rebar on the printed cement-based slurry layers 5; wherein, the sub-parts 1 are sandwiched between two upper and lower adjacent cement-based slurry layers 5, the insertion member 3 on one side of each of the sub-parts 1 is configured to be inserted in an upper cement-based slurry layer 5, and the insertion member 3 on an opposite end of each of the sub-parts 1 is configured to be inserted in a lower cement-based slurry layer 5.

Wherein, the device for 3D-printing the concrete interlayer structure comprises the lifting base frame 15; for example, the lifting base frame 15 can be a round rod. The concrete printing system and the rebar distributing system are both arranged on the lifting base frame 15 to be movable along the length direction of the lifting base frame 15; the lifting base frame 15 is able to move vertically to drive the concrete printing system and the rebar distributing system to move synchronously with each other.

Specifically, the rebar distributing system comprises a storage box 16 and a conveying structure 21. Wherein, the storage box 16 can be slidably arranged on the lifting base frame 15 through a slider and a slide rail structure, the bottom of the storage box 16 is provided with a rebar outlet, and the rebar can be coiled in the storage box 16 by a winding wheel; the conveying structure 21 is located outside the storage box 16, the conveying structure 21 is located below the storage box 16 and is arranged to directly face the rebar outlet, one end of the rebar extends out of the rebar outlet and is driven by the conveying structure 21 to be transported to a target position.

Figure 12:
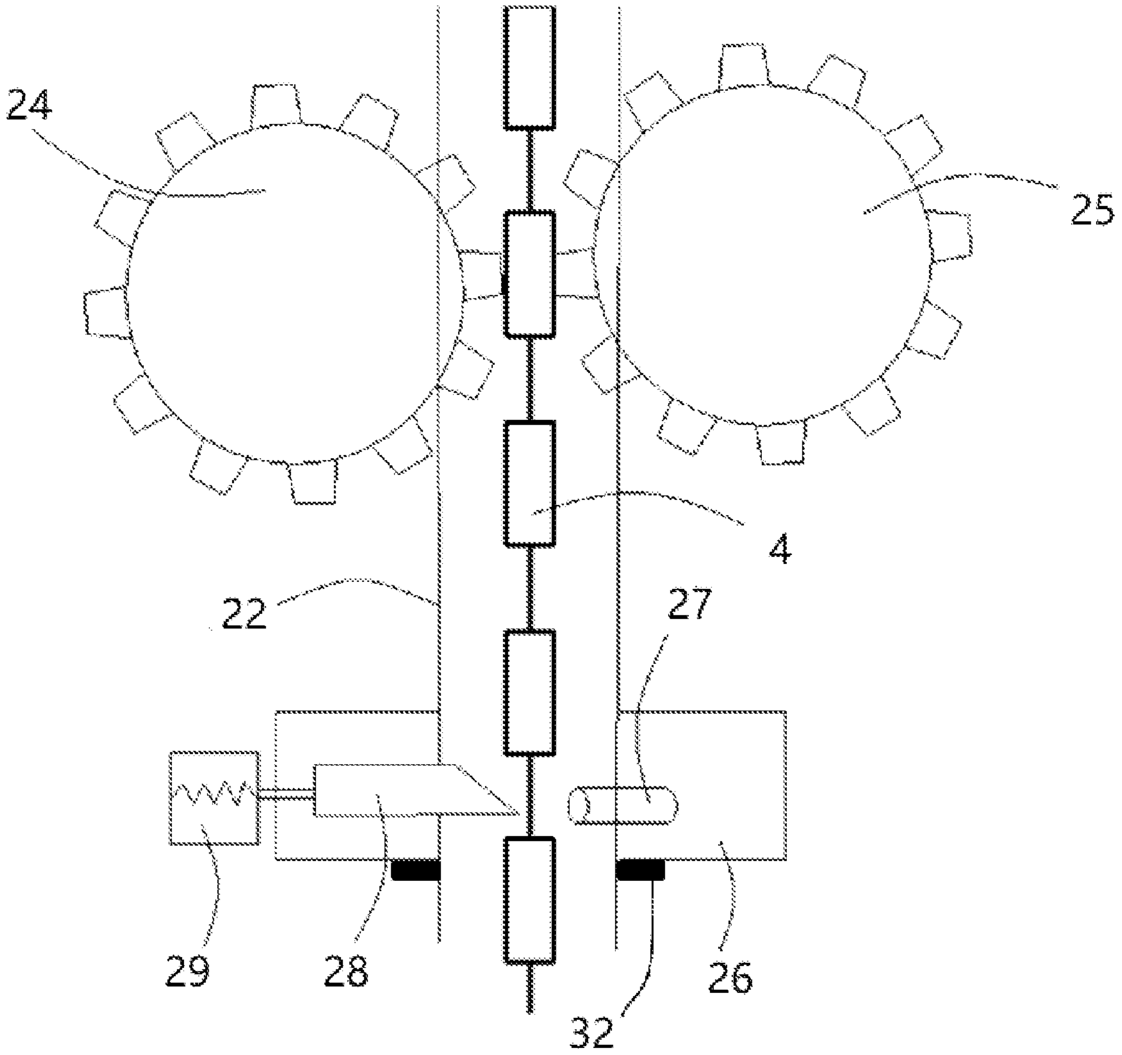
FIG. 12 is an enlarged schematic diagram of a local structure of a device for 3D-printing a concrete interlayer structure in an embodiment of the present application.

FIG. 12 is an enlarged schematic diagram of a local structure of a device for 3D-printing a concrete interlayer structure in an embodiment of the present application; as shown in FIG. 12, wherein, the rebar distributing system further comprises a guide tube 22, the top end of the guide tube 22 is connected to the rebar outlet of the storage box 16. After the rebar comes out of the storage box 16, it enters the guide tube 22 and is transported downward along the guide tube 22. The bottom end of the guide tube 22 extends in the direction of the cement-based slurry layer 5; when the rebar is located in the guide tube 22, the elastic element between the insertion members 3 and each of the sub-parts 1 is in a compression state. When the rebar comes out of the guide tube 22, the elastic element is restored from deformation, and the insertion member 3 extends toward a direction away from the sub-part 1; a tube wall of the guide tube 22 is provided with an opening, and a working part of the conveying structure 21 is at least partially located in the guide tube 22 through the opening to be in contact with the rebar, and the working part is configured to drive the rebar forward along a conveying direction in the guide tube 22.

Wherein, the conveying structure 21 comprises a first conveying wheel 24, a second conveying wheel 25 and a power part; the first conveying wheel 24 and the second conveying wheel 25 are symmetrically arranged on both sides of the guide tube 22, the first conveying wheel 24 and the second conveying wheel 25 both at least partially extend into the guide tube 22 to be in contact with the rebar, the rebar is sandwiched between the first conveying wheel 24 and the second conveying wheel 25, and the length direction of the insertion members 3 is parallel to the axis of the first conveying wheel 24, so that the insertion member 3 does not interfere with the first conveying wheel 24 and the second conveying wheel 25. An output end of the power part is connected to the first conveying wheel 24 and is configured to drive the first conveying wheel 24 to rotate. For example, the power part may be a drive motor, and the output end of the power part is connected to the first conveying wheel 24. The first conveying wheel 24 and the second conveying wheel 25 may be connected to each other through a belt or a transmission chain, and the output end of the power part is configured to drive the first conveying wheel 24 to rotate to continuously convey the rebar downward. For example, along the length direction of the guide tube 22, two sets of first conveying wheels 24 and second conveying wheels 25 can be arranged in a spaced-apart manner. For example, both the first conveying wheel 24 and the second conveying wheel 25 can be gears or rollers.

For example, a controller 17 may be arranged on the storage box 16, the controller 17 is signal-connected to the power part to control the conveying structure 21 to continuously convey the rebar downward, so that the rebar is steadily distributed onto the printed cement-based slurry layer 5.

For example, the rebar distributing system further comprises a separation posture-adjustment box 26, through which the guide tube 22 passes, the box body of the separation posture-adjustment box 26 can be freely rotatably mounted on the guide tube 22, and the separation posture-adjustment 26 box is located on one side of the conveying structure 21 away from the storage box 16, i.e. below the conveying structure 21. The separation posture-adjustment box 26 comprises a separation part 28, a control valve 29 and a stopper 27; the separation part 28 and the stopper 27 are both arranged in the separation posture-adjustment box 26, the rebar passes through the separation posture-adjustment box 26 and the rebar in the guide tube is located between the separation part 28 and the stopper 27; the control valve 29 is connected to the separation part 28 and is configured to drive the separation part 28 to move towards the stopper 27 to separate the rebar into two sections.

For example, the control valve 29 may be an electromagnetic valve, and the separation part 28 may utilize a mechanical force, an electromagnetic force, airflow, or another mechanism or force that can separate the rebar. For example, the separation part 280 is connected to an external hydraulic cylinder to provide the separation part 28 with the required impinging pressure. When the control valve 29 is opened, the hydraulic cylinder extends out to drive the separation part 28 closer to the stopper 27, thereby cutting the connection rod between two adjacent sub-parts 3. For example, the stopper 27 may be fixedly arranged on the inner wall of the separation posture-adjustment box 26 to play a role for resisting impact.

Wherein, the rebar distributing system further comprises a rotation control part 32; one end of the guide tube 22 is connected to the outlet of the storage box 16, and an opposite end of the guide tube 22 sequentially passes through the conveying structure 21 and the separation posture-adjustment box 26 along the conveying direction of the rebar; the rotation control part 32 is connected to the separation posture-adjustment box 26 and located downstream of the separation posture-adjustment box 26. The rotation control part 32 can drive the separation posture-adjustment box 26 to rotate around the guide tube 22, ultimately causing the rebar to rotate and adjust its posture in the guide tube 22. For example, when the separation posture-adjustment box 26 clamps the rebar, the rotation control part 32 is activated to rotate the rebar by an angle ranging from 0° to 360° to adjust the posture of the rebar so that the insertion members 3 thereof can be vertically inserted into the cement-based slurry layer 5 after separation.

Of course, the rotation control part 32 may be located on one side of the separation posture-adjustment box 26 away from the storage box 16, and may also be located on the other side of the separation posture-adjustment box 26 adjacent to the storage box 16.

Figure 13:
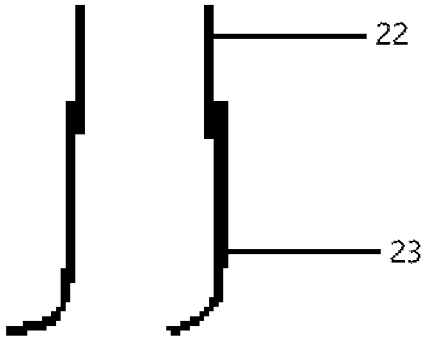
FIG. 13 is a schematic diagram of a guide nozzle of a device for 3D-printing a concrete interlayer structure in an embodiment of the present application.

FIG. 13 is a schematic diagram of a guide nozzle of a device for 3D-printing a concrete interlayer structure in an embodiment of the present application; as shown in FIG. 13, the rebar distributing system further comprises a guide nozzle 23; the guide nozzle 23 is arranged to be swingable at the outlet end of the guide tube 22 to swing the end of the separated rebar by a preset angle relative to the cement-based slurry layer 5. For example, the guide nozzle 23 can be an L-shaped structure, and the guide nozzle 23 may be rotatably inserted at the outlet end of the guide tube 22. When the guide nozzle 23 rotates, it can drive the output rebar to swing to the left or right in the horizontal plane by a preset angle, so that a small segment of the rebar protrudes toward the cement-based slurry layer 5 in an inclined manner.

Figure 14:
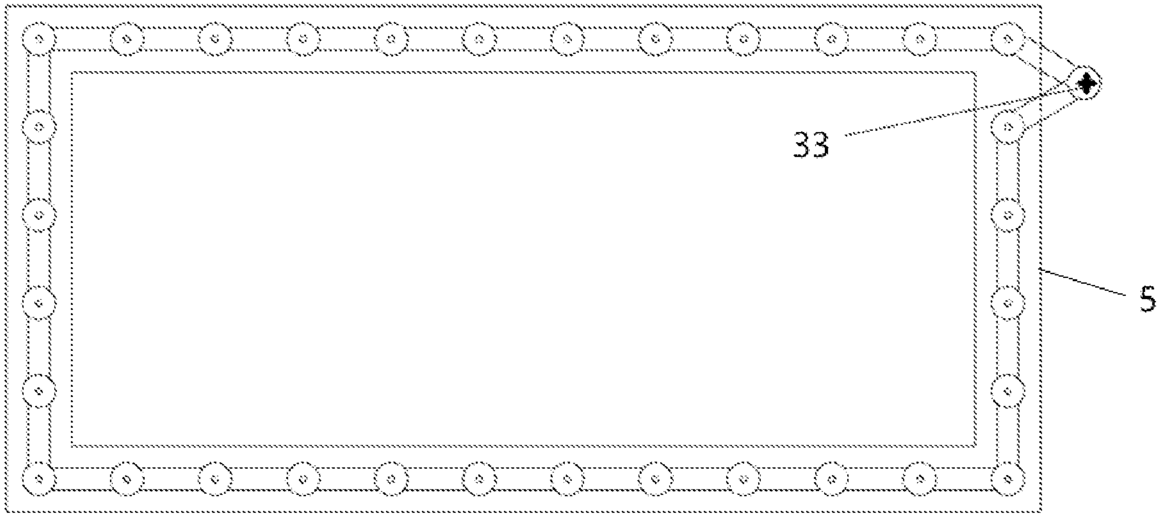
FIG. 14 is a schematic diagram of a rebar for 3D-printing a concrete interlayer structure in another state of use in an embodiment of the present application.
Figure 15:
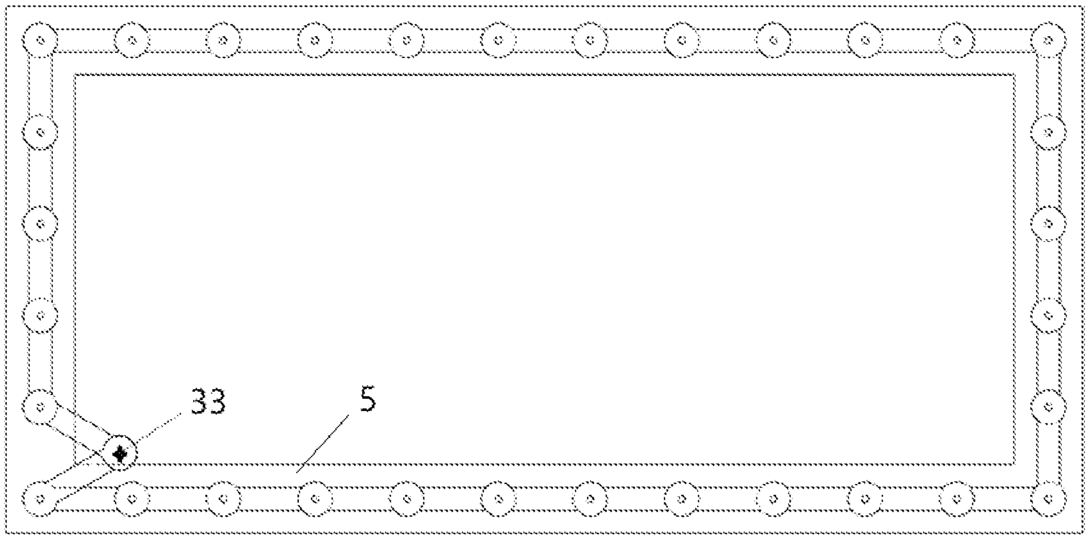
FIG. 15 is a schematic diagram of a rebar for 3D-printing a concrete interlayer structure in another state of use in an embodiment of the present application.

FIG. 14 is a schematic diagram of a rebar for 3D-printing a concrete interlayer structure in another state of use in an embodiment of the present application; FIG. 15 is a schematic diagram of a rebar for 3D-printing a concrete interlayer structure in yet another state of use in an embodiment of the present application, as shown in FIGS. 14-15, for example, the guide nozzle 23 can rotate the rebar by a certain angle after the rebar is separated from the long chain. The rebar can be swung towards the inner side of the cement-based slurry layer 5, the rebar can also be swung towards the outer side of the cement-based slurry layer 5, then each layer of rebar is swung by the certain angle by means of the guide nozzle 23. Because the rebar still has freedom on the plane, after the overall structure is printed, a continuous long steel bar 33 is used to penetrate and connect each layer of rebar to maintain the integrity of the printed concrete structure.

Moreover, the guide nozzle 23 can enable the insertion members 3 at the bottom of the rebar to be ejected and inserted into a lower cement-based slurry layer 5 after the rebar comes out, and the insertion member 3 at the top of the rebar is covered by an upper cement-based slurry layer 5 after being ejected, which is conducive to improving the distribution placement effect of the rebar.

Wherein, the concrete printing system comprises a mixer 19, a hopper 18, a screw extruder 20 and a print head; the hopper 18 may be slidably installed on the lifting base frame 15 through a slider and a slide rail structure. For example, the hopper 18 is located on the right side of the storage box 16, and the outlet of the mixer 19 may be connected to the inlet of the hopper 18 through a feed pipe 31 and be configured to supply concrete to the hopper 18. The motor of the screw extruder 20 is located outside the hopper 18, and the screw shaft of the screw extruder 20 is located inside the hopper 18. The motor drives the screw shaft to rotate to extrude concrete out of the hopper 18; the print head is arranged at the outlet of the hopper 18 so that the concrete extruded from the hopper 18 has a preset 3D structure. Different print heads may replace one another according to different 3D structures.

Moreover, a flow detection device may be installed on the screw shaft of the screw extruder 20 and be signal-connected to the control system 14 to adaptively adjust the rotational speed of the screw extruder 20 according to the detected fluidity of the slurry. In addition, when a risk of solidification of the slurry is detected, an alarm is given.

Wherein, the control system 14 is signal-connected to both the concrete printing system and the rebar distributing system, and is configured to control the synchronous movement of the concrete printing system and the rebar distributing system along the lifting base frame 15.

Wherein, the storage box 16 and the hopper 18 may also be installed on the lifting base frame 15 through a screw rod and a nut structure. For example, screw threads may be arranged on the surface of the lifting base frame 15, so the lifting base frame 15 is used as a screw rod, a nut is welded on an outer wall of each of the storage box 16 and the hopper 18 and sleeved on the lifting base frame 15. An electric motor is arranged at one end of the lifting base frame 15 to drive the lifting base frame 15 to rotate, thereby driving the storage box 16 and the hopper 18 to move along the lifting base frame 15.

Similarly, a nut may be arranged at an opposite end of the lifting base frame 15, and a lead screw may be arranged in a direction perpendicular to the lifting base frame 15. The nut is sleeved on the lead screw which is connected to another motor, and this motor drives the lead screw to rotate, thereby driving the lifting base frame 15 to move up and down vertically.

A construction method of a 3D-printed concrete interlayer structure provided in another embodiment uses the above-mentioned rebar and the above-mentioned device, and the method comprises the following steps: using the concrete printing system to print a cement-based slurry layer 5 on a building base; using the rebar distributing system to lay the rebar on the surface of the printed cement-based slurry layer 5; printing the respective cement-based slurry layers and distributing the rebar thereon layer by layer to sandwich the sub-parts 1 between two adjacent upper and lower cement-based slurry layers 5, wherein the insertion member 3 on one side of each of the sub-parts 1 is inserted in an upper cement-based slurry layer 5, and the insertion member 3 on an opposite side of each of the sub-parts 1 is inserted in a lower cement-based slurry layer 5, until the printing of building structure is completed.

Wherein, the construction method further comprises the following steps before using the concrete printing system to print the cement-based slurry layer 5 on the building base: digitally modeling the print structure to generate G code; loading the rebar distributing system with the rebar and setting operation parameters thereof; stirring cement-based materials sufficiently and delivering the stirred cement-based materials to the concrete printing system; starting up a control system 14, importing the G code and debugging the print parameters; moving the concrete printing system and the rebar distributing system synchronously with the lifting base frame 15.

Figure 7:
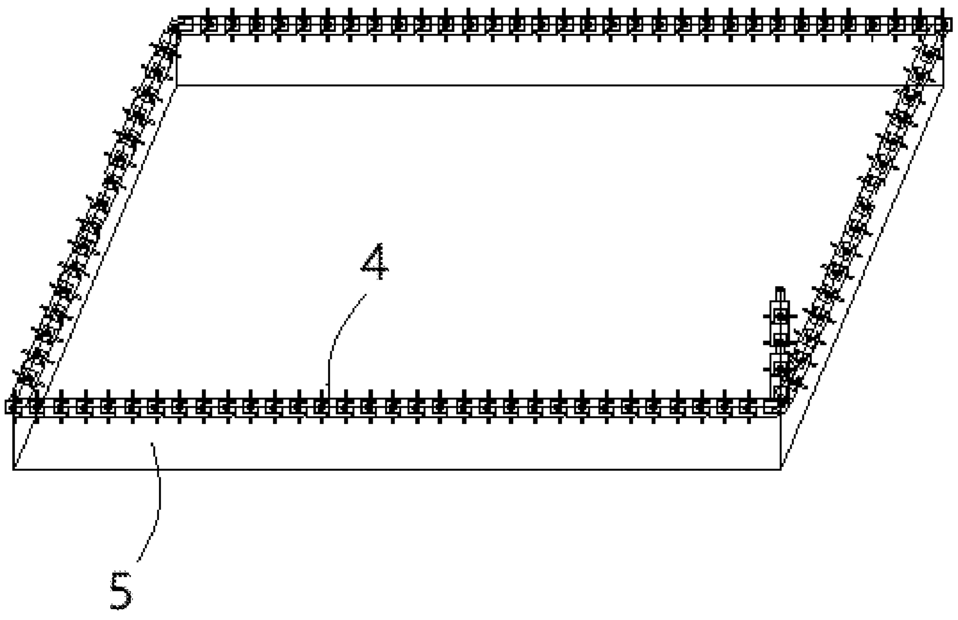
FIG. 7 is a schematic diagram of a rebar for 3D-printing a concrete interlayer structure in one state of use in an embodiment of the present application.

FIG. 7 is a schematic diagram of a rebar for 3D-printing a concrete interlayer structure in one state of use in an embodiment of the present application; as shown in FIG. 7, wherein, when printing the respective cement-based slurry layers and distributing the rebar thereon layer by layer: after one layer is printed, a print head of the concrete printing system and the rebar distributing system are lifted by the height of one layer, and then the next cement-based slurry layer 5 is printed and the rebar is distributed thereon; wherein the rebar distributing system distributes the rebar continuously during the lifting process, so that the rebar is continuous between two adjacent cement-based slurry layers 5.

Figure 8:
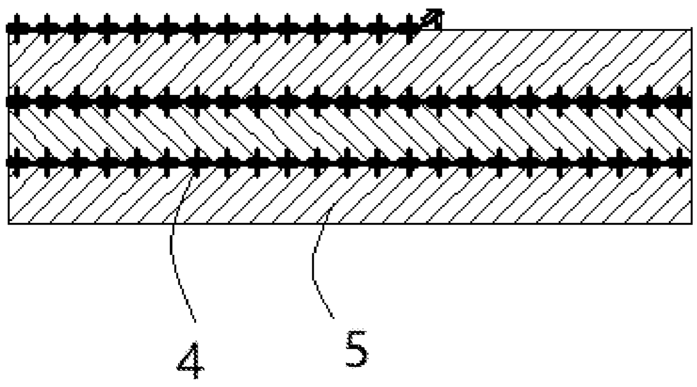
FIG. 8 is a cross-sectional view of a rebar for 3D-printing a concrete interlayer structure in a state of use in an embodiment of the present application.

FIG. 8 is a cross-sectional view of a rebar for 3D-printing a concrete interlayer structure in a state of use in an embodiment of the present application; as shown in FIG. 8, in a certain construction scenario, the step of printing the respective cement-based slurry layers and distributing the rebar thereon layer by layer until the printing of building structure is completed specifically comprises: after one layer is printed, separating the rebar by using the separate posture-adjustment box 26; lifting a print head of the concrete printing system and the rebar distributing system by the height of one layer, and then printing the next cement-based slurry layer 5 and distributing the rebar thereon, until the printing of building structure is completed.

Figure 9:
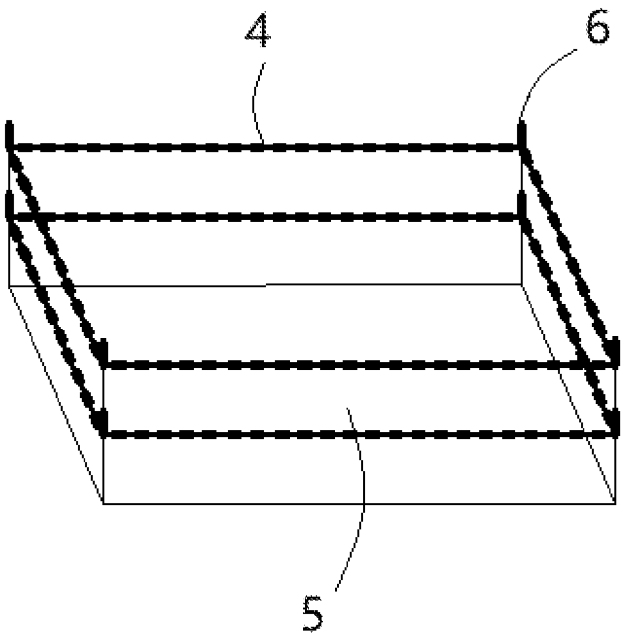
FIG. 9 is a schematic diagram of a rebar for 3D-printing a concrete interlayer structure in another state of use in an embodiment of the present application.

FIG. 9 is a schematic diagram of a rebar for 3D-printing a concrete interlayer structure in another state of use in an embodiment of the present application; as shown in FIG. 9, wherein, in a certain construction scenario, the step of printing the respective cement-based slurry layers and distributing the rebar thereon layer by layer until the printing of building structure is completed specifically comprises: after one layer is printed, separating the rebar by using the separate posture-adjustment box 26; inserting a short bar 6 at each of the four corners of each cement-based slurry layer 5, for example, the short bar 6 can be arranged vertically to form a tight connection between the rebar and the printed cement-based slurry layer 5 in the vertical direction; lifting a print head of the concrete printing system and the rebar distributing system by the height of one layer, and then printing the next cement-based slurry layer 5 and distributing the rebar thereon, until the printing of building structure is completed.

Figure 10:
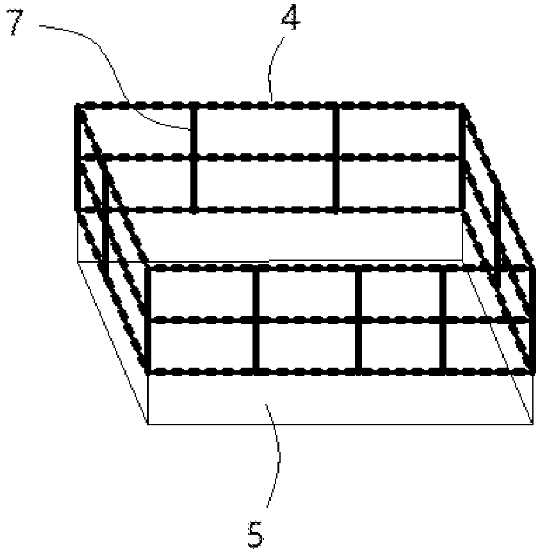
FIG. 10 is a cross sectional diagram of a rebar for 3D-printing a concrete interlayer structure in another state of use in an embodiment of the present application.

FIG. 10 is a cross sectional diagram of a rebar for 3D-printing a concrete interlayer structure in another state of use in an embodiment of the present application; as shown in FIG. 10, wherein, in a certain construction scenario, the step of printing the respective cement-based slurry layers and distributing the rebar thereon layer by layer until the printing of building structure is completed specifically comprises: after one layer is printed, separating the rebar by using the separate posture-adjustment box 26; lifting a print head of the concrete printing system and the rebar distributing system by the height of one layer, and then printing the next cement-based slurry layer 5 and distributing the rebar thereon; and for every n layers, vertically inserting thin steel bars 7 of equal height at the corners of the cement-based slurry layers 5 to form a tight connection between the rebar and the printed n layers of cement based slurry layers 5 in the vertical direction, until the printing of the building structure is completed; wherein n is an integer that is not less than 2. For example, n can be 2, 3, 4, and so on.

In summary, in the construction method of 3D-printed concrete interlayer structure in the present application, under the action of the control system 14, the concrete printing system and the reinforcement system are synchronously operated, and the rebar is controlled to be smoothly and continuously placed between adjacent cement based slurry layers 5, which enhances the interlayer bonding strength and stability of the 3D-printed product, achieves the automation of rebar distributing while printing, and is conducive to improving work efficiency. Apparently, the above embodiments are only examples for clear explanation, not for limiting the implementation ways thereof. For a person with ordinary skill in the art, other changes or modifications in various other forms can be made on the basis of the above-mentioned description. It is unnecessary and impossible to enumerate all embodiments herein. Any obvious change or modification derived therefrom is still within the protection scope of the present application.

What is claimed is:

1. A device for 3D-printing a concrete interlayer structure, characterized by comprising a rebar, the rebar at least comprises:

a body in the form of a chain structure, comprising a plurality of sub-parts mutually spliced, the body being adapted for being sandwiched between two adjacent upper and lower cement-based slurry layers;

a rotatable joint arranged between two adjacent sub-parts in such a way that the two adjacent sub-parts are rotatably connected to each other;

insertion members, wherein both sides of each of the sub-parts are provided with the insertion members extending away from the center of each of the sub-parts, the insertion member on one side of each of the sub-parts is adapted for being inserted in an upper cement-based slurry layer, and the insertion member on an opposite side of each of the sub-parts is adapted for being inserted in a lower cement-based slurry layer;

wherein the device further comprises:

a concrete printing system configured to print cement-based slurry layers stacked from bottom to top on a building base;

a rebar distributing system configured to lay the rebar on the printed cement-based slurry layers;

wherein, the sub-parts are sandwiched between two upper and lower adjacent cement-based slurry layers, the insertion member on one side of each of the sub-parts is configured to be inserted in an upper cement-based slurry layer, and the insertion member on an opposite end of each of the sub-parts is configured to be inserted in a lower cement-based slurry layer;

wherein the rebar distributing system comprises a storage box and a conveying structure;

the storage box is provided with a rebar outlet, and the rebar is coiled in the storage box;

the conveying structure is located outside the storage box and is arranged to directly face the rebar outlet, one end of the rebar extends out of the rebar outlet and is driven by the conveying structure to be transported to a target position;

wherein the rebar distributing system further comprises a guide tube;

one end of the guide tube is communicated with the rebar outlet of the storage box, and an opposite end of the guide tube extends toward the direction of the cement-based slurry layer;

when the rebar is located in the guide tube, an elastic element between the insertion members and each sub-part is in a compression state; and a tube wall of the guide tube is provided with an opening, and a working part of the conveying structure is at least partially located in the guide tube through the opening to be in contact with the rebar, and the working part is configured to drive the rebar forward along a conveying direction in the guide tube.

2. The device for 3D-printing the concrete interlayer structure according to claim 1, wherein the conveying structure comprises a first conveying wheel, a second conveying wheel and a power part;

the first conveying wheel and the second conveying wheel are symmetrically arranged on both sides of the guide tube, the first conveying wheel and the second conveying wheel both at least partially extend into the guide tube, the rebar is sandwiched between the first conveying wheel and the second conveying wheel, and the length direction of the insertion members is parallel to the axis of the first conveying wheel; and an output end of the power part is connected to the first conveying wheel and is configured to drive the first conveying wheel to rotate.

3. The device for 3D-printing the concrete interlayer structure according to claim 1, wherein the rebar distributing system further comprises a separation posture-adjustment box which comprises a separation part, a control valve and a stopper;

the separation posture-adjustment box is located on one side of the conveying structure away from the storage box, and the guide tube passes through the separation posture-adjustment box;

the separation part and the stopper are both arranged in the separation posture-adjustment box, and the rebar in the guide tube is located between the separation part and the stopper; and the control valve is connected to the separation part and is configured to drive the separation part to move towards the stopper to separate the rebar.

4. The device for 3D-printing the concrete interlayer structure according to claim 1, wherein the concrete printing system comprises a mixer, a hopper, a screw extruder and a print head;

an outlet of the mixer is connected to an inlet of the hopper and is configured to provide concrete to the hopper;

the screw extruder is arranged in the hopper and is configured to extrude the concrete out of the hopper; and the print head is arranged at an outlet of the hopper so that the concrete extruded from the hopper has a preset 3D structure.

5. The device for 3D-printing the concrete interlayer structure according to claim 1, wherein the device further comprises:

a lifting base frame;

wherein the concrete printing system and the rebar distributing system are both arranged on the lifting base frame to be movable along the length direction of the lifting base frame; and the lifting base frame is able to move vertically to drive the concrete printing system and the rebar distributing system to move synchronously with each other.

6. The device for 3D-printing the concrete interlayer structure according to claim 5, wherein the device further comprises:

a control system;

wherein the control system is signal-connected to both the concrete printing system and the rebar distributing system, and is configured to control synchronous movement of the concrete printing system and the rebar distributing system along the lifting base frame.

7. The device for 3D-printing the concrete interlayer structure according to claim 1, wherein the rotatable joint comprises a connection block, a first rotatable shaft and a second rotatable shaft;

the first rotatable shaft and the second rotatable shaft are both arranged on the connection block, and the first rotatable shaft and the second rotatable shaft are perpendicular to each other; and one of the two adjacent sub-parts is rotatably connected to the first rotatable shaft, and the other one of the two adjacent sub-parts is rotatably connected to the second rotatable shaft.

8. The device for 3D-printing the concrete interlayer structure according to claim 5, characterized in that, wherein the rotatable joint comprises a first convex part and a first groove; the first convex part is located on one end of each sub-part, the first groove is located on an opposite end of each sub-part, and the two adjacent sub-parts are connected to each other through the first groove and the first convex part.

9. The device for 3D-printing the concrete interlayer structure according to claim 1, wherein the rebar further comprises:

an elastic element arranged between each sub-part and the insertion members, so that the insertion members are telescopically arranged on both sides of each sub-part.

10. A construction method of a 3D-printed concrete interlayer structure, characterized by using the rebar and the device according to claim 1, and comprising the following steps:

using the concrete printing system to print a cement-based slurry layer on a building base;

using the rebar distributing system to lay the rebar on the surface of the printed cement-based slurry layer; and printing the respective cement-based slurry layers and distributing the rebar thereon layer by layer to sandwich the sub-parts between two adjacent upper and lower cement-based slurry layers, wherein the insertion member on one side of each of the sub-parts is inserted in an upper cement-based slurry layer, and the insertion member on an opposite side of each of the sub-parts is inserted in a lower cement-based slurry layer, until the printing of building structure is completed.

11. The construction method of a 3D-printed concrete interlayer structure according to claim 10, characterized by further comprising the following steps before using the concrete printing system to print the cement-based slurry layer on the building base:

digitally modeling the print structure to generate G code;

loading the rebar distributing system with the rebar and setting operation parameters thereof;

stirring cement-based materials sufficiently and delivering the stirred cement-based materials to the concrete printing system;

starting up a control system, importing the G code and debugging the print parameters; and moving the concrete printing system and the rebar distributing system synchronously with a lifting base frame.

12. The construction method of a 3D-printed concrete interlayer structure according to claim 10, characterized in that, when printing the respective cement-based slurry layers and distributing the rebar thereon layer by layer; after one layer is printed, lifting a print head of the concrete printing system and the rebar distributing system by the height of one layer, and then printing the next cement-based slurry layer and distributing the rebar thereon;

wherein the rebar distributing system distributes the rebar continuously during the lifting process, so that the rebar is continuous between two adjacent cement-based slurry layers.

* * * * *